(12) United States Patent
Gao et al.

(10) Patent No.: US 9,088,018 B2
(45) Date of Patent: Jul. 21, 2015

(54) WATER HARVESTING SYSTEM

(75) Inventors: Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 829 days.

(21) Appl. No.: 12/968,889

(22) Filed: Dec. 15, 2010

(65) Prior Publication Data

US 2012/0156580 A1 Jun. 21, 2012

(51) Int. Cl.
*H01M 8/04* (2006.01)
*B01D 1/00* (2006.01)
*B01D 5/00* (2006.01)
*F26B 3/20* (2006.01)
*F26B 23/00* (2006.01)
*F26B 23/10* (2006.01)
*E03B 3/28* (2006.01)
*H01M 8/12* (2006.01)

(52) U.S. Cl.
CPC ......... *H01M 8/04164* (2013.01); *B01D 1/0017* (2013.01); *B01D 5/0042* (2013.01); *E03B 3/28* (2013.01); *F26B 3/20* (2013.01); *F26B 23/001* (2013.01); *F26B 23/10* (2013.01); *H01M 8/04007* (2013.01); *H01M 8/0432* (2013.01); *H01M 8/0494* (2013.01); *H01M 8/04925* (2013.01); *H01M 2008/1293* (2013.01); *H01M 2250/00* (2013.01); *H01M 2250/10* (2013.01); *Y02B 90/14* (2013.01); *Y02E 60/50* (2013.01); *Y02E 60/525* (2013.01)

(58) Field of Classification Search
USPC .............. 34/519–21, 391–396, 428–436, 34/468–471; 62/3.1–3.7; 165/66; 429/430–432
See application file for complete search history.

(56) References Cited

U.S. PATENT DOCUMENTS

| 4,037,024 A | 7/1977 | Landau |
| 4,205,456 A | 6/1980 | Ayers et al. |
| 6,376,111 B1 * | 4/2002 | Mathias et al. ............... 429/413 |

(Continued)

FOREIGN PATENT DOCUMENTS

| NL | 8303005 | 3/1985 |
| WO | WO 2007071536 A1 * | 6/2007 |
| WO | 2012082208 A1 | 6/2012 |

OTHER PUBLICATIONS

PCT Search Report with Written Opinion dated Feb. 14, 2012 regarding international application No. PCT/US2011/052890, applicant The Boeing Company, 11 pages.

*Primary Examiner* — Maria J Laios
*Assistant Examiner* — Robert S Carrico
(74) *Attorney, Agent, or Firm* — Yee & Associates, P.C.

(57) ABSTRACT

A method and apparatus for extracting water. The apparatus comprises a first and second cooling device and a controller. The first cooling device has a first and second side. The first side heats materials located at the first side and generates a water vapor. The second side cools the water vapor and fluids collected from a source. The second cooling device transfers heat from the water vapor and the fluids flowing through the second cooling device to an environment around the second cooling device. A controller controls a first amount of power delivered to the first cooling device and a second amount of power delivered to the second cooling device based on a temperature for the fluids and the water vapor at an output. Water extracted from the fluids and the water vapor by cooling the fluids and the water vapor is collected at the output.

30 Claims, 6 Drawing Sheets

(56) References Cited

U.S. PATENT DOCUMENTS

| | | |
|---|---|---|
| 6,828,499 B2 | 12/2004 | Max |
| 6,945,063 B2 | 9/2005 | Max |
| 7,526,879 B2 * | 5/2009 | Bae et al. .................... 34/596 |
| 7,846,602 B2 * | 12/2010 | Kamachi et al. ............. 429/433 |
| 2007/0101607 A1 | 5/2007 | Katefidis et al. |
| 2008/0184589 A1 * | 8/2008 | Shivvers ....................... 34/504 |
| 2009/0242173 A1 * | 10/2009 | Mitchell et al. .......... 165/104.19 |
| 2010/0088920 A1 | 4/2010 | LaRou |

* cited by examiner

WATER HARVESTING SYSTEM

BACKGROUND INFORMATION

1. Field

The present disclosure relates generally to harvesting water and, in particular, to harvesting water from a number of different sources. Still more particularly, the present disclosure relates to harvesting water from fuel cell exhaust and materials containing water.

2. Background

Water is one of the basic necessities of life for humans and other life on Earth. For example, clean drinking water is essential to humans and/or other life forms. Further, humans use water in a number of different ways. For example, humans use water to drink, bathe, cook, clean, and perform other types of activities related to daily living. However, water is also used in a number of other different ways. For example, water may be used in sanitation processes, manufacturing processes, cooling processes related to machinery, and/or other suitable types of processes. Still further, water is also used for recreational purposes.

Water may not easily be found in certain geographic locations. These locations may include, for example, deserts, remote military bases, and areas where clean water is not readily available. Different types of methods for collecting water for human and/or industrial use in these types of geographic locations are present. For example, irrigation, dams, wells, and/or other systems are currently used for collecting water.

Further, some currently available systems for harvesting water include collecting and storing rainwater that is later purified for use. However, with these types of systems, the amount of water collected in locations where rainwater is scarce may be less than desired. Additionally, currently available systems that include collecting rainwater and/or pumping shallow wells for water in locations where rainwater is scarce for human and/or industrial use may have undesired effects on the environment in these locations. For example, collecting rainfall in these locations may reduce and/or prevent the replenishing of water in groundwater systems.

Therefore, it would be advantageous to have a method and apparatus that takes into account at least some of the issues discussed above, as well as possibly other issues.

SUMMARY

In one advantageous embodiment, a water extraction system comprises a fuel cell system, a cooling device, a collection system, a radiator system, an output system, and a controller. The fuel cell system is configured to generate power. The fuel cell system generates a number of fluids in response to generating the power. The cooling device has a first side and a second side. The cooling device is connected to the fuel cell system and operates using the power generated by the fuel cell system. The first side is configured to heat a number of materials located at the first side of the cooling device in which water in the number of materials is converted into a water vapor. The collection system is configured to collect the water vapor generated by heating the number of materials and the number of fluids generated by the fuel cell system. The radiator system is connected to the fuel cell system and the collection system and configured to transfer heat from the water vapor and the number of fluids to an environment around the radiator system. The output system is connected to the radiator system. The output system is configured to direct the water vapor and the number of fluids from the radiator system to the second side of the cooling device. The second side cools the water vapor and the number of fluids. The controller is configured to control a first amount of power delivered to the cooling device and a second amount of power delivered to the radiator system based on a temperature for the number of fluids and the water vapor at an output of the output system.

In another advantageous embodiment, an apparatus comprises a first cooling device, a second cooling device, and a controller. The first cooling device has a first side and a second side. The first side is configured to heat a number of materials located at the first side of the first cooling device to generate a water vapor. The second side is configured to cool the water vapor and a number of fluids collected from a source. The second cooling device is configured to transfer heat from the water vapor and the number of fluids flowing through the second cooling device to an environment around the second cooling device. A controller is configured to control a first amount of power delivered to the first cooling device and a second amount of power delivered to the second cooling device based on a temperature for the number of fluids and the water vapor at an output for the number of fluids and the water vapor. Water extracted from the number of fluids and the water vapor by cooling the number of fluids and the water vapor is collected at the output.

In yet another advantageous embodiment, a method is provided for extracting water. A number of materials are heated using a first side of a first cooling device to generate a water vapor. The number of materials is located at the first side of the first cooling device. The water vapor and a number of fluids collected from a fuel cell system are cooled using a second cooling device. The water vapor and the number of fluids are cooled using a second side of the first cooling device. A first amount of power delivered to the first cooling device and a second amount of power delivered to the second cooling device are controlled based on a temperature for the number of fluids and the water vapor at an output for the number of fluids and the water vapor. Water extracted from the number of fluids and the water vapor by cooling the number of fluids and the water vapor is collected at the output.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that currently available systems for collecting water include extracting water from air having a relatively high humidity. For example, a relatively high humidity may be about 50, percent humidity.

The different advantageous embodiments recognize and take into account that with these types of systems, the extraction of water from the air is limited by the air humidity. In other words, as the humidity of the air decreases, the amount of water that may be extracted from the air also decreases. Further, the speed at which water may be extracted from the air may be slower than desired.

Additionally, the different advantageous embodiments recognize and take into account that some currently available systems for collecting water include collecting steam from a fuel cell system or engine exhaust and condensing the steam to extract water from the exhaust. However, with these types of systems, the amount of water that is produced is limited by the amount of fuel that can be consumed by the fuel cell system or combusted by the engine.

The different advantageous embodiments recognize and take into account that it may be desirable to have a system for extracting water from both fuel cell system exhaust and materials containing water. By extracting water from two sources at the same time as compared to one source, the efficiency of extracting the water may be increased.

Further, the different advantageous embodiments also recognize and take into account that a cooling device, such as a thermoelectric cooler or Peltier device, may have a cold side that has a temperature between about zero degrees Celsius and about 40, degrees Celsius, and a hot side that has a temperature between about 100, degrees Celsius to about 250, degrees Celsius. Of course, in some cases, the ranges of temperatures for the cold side and/or hot side of the cooling device may include other temperatures in addition to or in the place of the temperatures described above.

The different advantageous embodiments also recognize and take into account that the thermoelectric cooler can control the temperature difference between the cold side and the hot side. Further, the lower temperatures of the thermoelectric cooler allow a greater amount of water to be extracted using condensation, as compared to the other cooling devices that do not have these low temperatures.

The different advantageous embodiments also recognize and take into account that it may be desirable to use power generated by a fuel cell system to operate the thermoelectric cooler to cool the exhaust generated in response to generating the power. The different advantageous embodiments recognize and take into account that using both a thermoelectric cooler and a radiator system to cool the exhaust generated by the fuel cell system may allow a greater amount of water to be extracted from the exhaust.

Thus, the different advantageous embodiments provide a method and apparatus for extracting water. In one advantageous embodiment, the method comprises a first cooling device, a second cooling device, and a controller. The first cooling device has a first side and a second side. The first side is configured to heat a number of materials located at the first side of the first cooling device to generate a water vapor. The second side is configured to cool the water vapor and a number of fluids collected from a source.

The second cooling device is configured to transfer heat from the water vapor and the number of fluids flowing through the second cooling device to an environment around the second cooling device. A controller is configured to control a first amount of power delivered to the first cooling device and a second amount of power delivered to the second cooling device based on a temperature for the number of fluids and the water vapor at an output for the number of fluids and the water vapor. Water extracted from the number of fluids and the water vapor by cooling the number of fluids and the water vapor is collected at the output.

Figure 1:
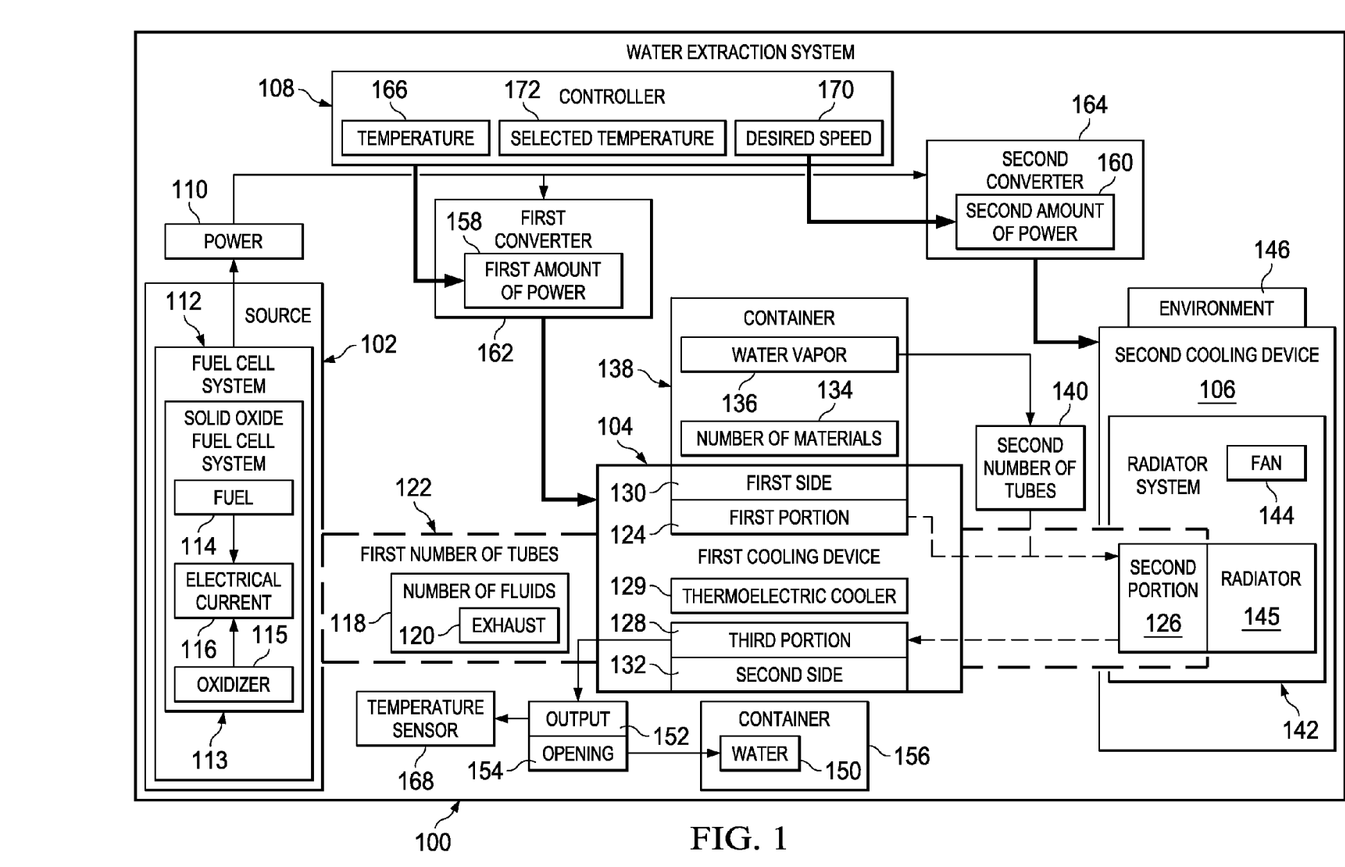
FIG. 1 is an illustration of a water extraction system in accordance with an advantageous embodiment.

With reference now to FIG. 1, an illustration of a block diagram of a water extraction system is depicted in accordance with an advantageous embodiment. In these illustrative examples, water extraction system 100 is an example of one environment in which the different advantageous embodiments may be implemented. As depicted, water extraction system 100 includes source 102, first cooling device 104, second cooling device 106, and controller 108.

In these illustrative examples, source 102 is configured to generate power 110. Power 110 is used to operate first cooling device 104 and second cooling device 106. As depicted in these examples, source 102 takes the form of fuel cell system 112. More specifically, fuel cell system 112 is solid oxide fuel cell system 113 in these illustrative examples. Of course, source 102 may be some other suitable type of fuel cell system, such as, for example, a proton exchange membrane fuel cell system, a direct methanol fuel cell system, a phosphoric acid fuel cell system, an alkaline fuel cell system, a molten carbonate fuel cell system, or some other type of fuel cell system.

Fuel cell system 112 comprises an electrochemical cell configured to convert fuel 114 and oxidizer 115 into electrical current 116. Electrical current 116 is a direct current in these illustrative examples. In these illustrative examples, oxidizer 115 is air.

The flow of electrical current 116 at a particular voltage generates power 110 that is delivered to first cooling device 104 and second cooling device 106. In these depicted examples, fuel 114 may be, for example, without limitation, hydrogen, a hydrocarbon, alcohol, and/or some other suitable type of fuel.

In these illustrative examples, fuel cell system 112 generates number of fluids 118 in response to generating power 110. As used herein, a number of items means one or more items. For example, a number of fluids is one or more fluids. Number of fluids 118 comprises at least one of a liquid and a gas. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In these illustrative examples, number of fluids 118 is exhaust 120 for fuel cell system 112. Exhaust 120 includes the chemicals produced in response to converting fuel 114 into electrical current 116. As one illustrative example, when fuel 114 takes the form of hydrogen, exhaust 120 comprises carbon dioxide, water, and a number of other substances.

In these depicted examples, the fluids in number of fluids 118 are hot fluids. The temperature of number of fluids 118 may be controlled using fuel cell system 112. As one illustrative example, fuel cell system 112 may be configured such that number of fluids 118 has a temperature between about 100, degrees Celsius to about 250, degrees Celsius. Of course, in other illustrative examples, the temperature of number of fluids 118 may be within some other range of temperatures.

Number of fluids 118 flows from fuel cell system 112 into first number of tubes 122. In these illustrative examples, a tube is an elongate hollow object that is configured to hold fluid and allow the fluid to flow through the object. In some cases, more than one tube may be connected together to form one channel for number of fluids 118. A tube that is flexible may also be referred to as a hose. In this manner, first number of tubes 122 may be a number of hoses.

First number of tubes 122 includes first portion 124, second portion 126, third portion 128, and/or other portions. First number of tubes 122 allows number of fluids 118 to flow from fuel cell system 112 towards first cooling device 104.

In these illustrative examples, first cooling device 104 takes the form of thermoelectric cooler 129. In particular, thermoelectric cooler 129 is a Peltier device in these examples.

First cooling device 104 has first side 130 and second side 132. First cooling device 104 uses power 110 generated by fuel cell system 112 to generate a temperature difference between first side 130 and second side 132. In particular, first cooling device 104 uses power 110 to warm first side 130 and cool second side 132. In other words, first side 130 is a hot side, and second side 132 is a cold side.

As depicted, number of materials 134 is located at first side 130 of first cooling device 104. Number of materials 134 comprises materials that contain water. For example, without limitation, number of materials 134 may comprise at least one of soil, grass, dirt, leaves, tree bark, plant stems, flowers, and/or other types of materials that contain water.

First side 130 of first cooling device 104 is configured to heat number of materials 134 located at first side 130 to generate water vapor 136. In particular, heating number of materials 134 converts water in number of materials 134 into water vapor 136. Container 138 on first side 130 of first cooling device 104 holds water vapor 136 as water vapor 136 is generated. Container 138 may be any type of container configured to hold water vapor 136 and prevent water vapor 136 from being released into the area around container 138 and first cooling device 104.

In these illustrative examples, number of materials 134 is also heated by number of fluids 118 flowing in first number of tubes 122. For example, number of fluids 118 flowing in first number of tubes 122 from fuel cell system 112 flows into first portion 124 of first number of tubes 122. First portion 124 of first number of tubes 122 is thermally connected to first side 130 of first cooling device 104 in these illustrative examples.

In these depicted examples, a thermal connection between two items allows heat from one item to be transferred to the other item. For example, two items may be thermally connected by being in direct contact with each other such that heat is transferred from one item to the other item. In some illustrative examples, two items may be thermally connected with a third item in between the two items. In other illustrative examples, two items may be thermally connected with a gap or space in between the two items.

First portion 124 of first number of tubes 122 is thermally connected to first side 130 of first cooling device 104 such that heat from number of fluids 118 transfers to first side 130 of first cooling device 104. The additional heat from number of fluids 118 at first side 130 further heats number of materials 134 to generate water vapor 136.

Additionally, number of fluids 118 cools as number of fluids 118 travels through first portion 124 of first number of tubes 122. In particular, number of fluids 118 transfers heat to number of materials 134. This transfer of heat causes number of fluids 118 to cool as number of fluids 118 travels through first portion 124 of first number of tubes 122.

In these depicted examples, the temperature of number of fluids 118 may be controlled using fuel cell system 112 such that undesired decomposition of the chemicals in number of materials 134 is reduced and/or prevented when heating number of materials 134 using number of fluids 118. Further, if the temperature of number of fluids 118 is higher than desired, heat may be lost from number of fluids 118 as number of fluids 118 flows through first portion 124 of first number of tubes 122 without the heat being effectively used to heat number of materials 134.

In these illustrative examples, number of fluids 118 flowing through first portion 124 of first number of tubes 122 flows into second portion 126 of first number of tubes 122. Additionally, water vapor 136 flows from container 138 into second portion 126 of first number of tubes 122 through second number of tubes 140.

Second number of tubes 140 is connected to container 138 and first number of tubes 122. The connection between second number of tubes 140 and first number of tubes 122 is configured such that an output of second number of tubes 140 allows water vapor 136 flowing in second number of tubes 140 to flow into second portion 126 of first number of tubes 122 without flowing into first portion 124.

As depicted, second portion 126 is in second cooling device 106. Second cooling device 106 takes the form of radiator system 142. Radiator system 142 is a cooling system that operates using power 110 generated by fuel cell system 112.

Second cooling device 106 comprises second portion 126 of first number of tubes 122, fan 144, and radiator 145. Second portion 126 of first number of tubes 122 is configured to transfer heat from number of fluids 118 and water vapor 136 flowing within second cooling device 106 to environment 146 around radiator system 142. In particular, number of fluids 118 and water vapor 136 transfer heat to second portion 126 of first number of tubes 122, which, in turn, transfers the heat to environment 146 using radiator 145.

Radiator 145 includes fins or extrusions attached to second portion 126 of first number of tubes 122. These fins or extrusions form a larger area from which heat can be dissipated, as compared to the surface area of second portion 126 of first number of tubes 122.

In these illustrative examples, environment 146 includes the air around second cooling device 106. Fan 144 in second cooling device 106 is configured to generate airflow in environment 146 around second cooling device 106. This airflow moves the air that has been heated in environment 146 away from second portion 126. Heat may be more easily transferred to cool air, as compared to heated air. Fan 144 cools the air in environment 146 around second cooling device 106 such that heat may continue to be transferred from number of fluids 118 and water vapor 136 flowing in second portion 126 to environment 146.

Number of fluids 118 and water vapor 136 flowing in second portion 126 of first number of tubes 122 flows into third portion 128 of first number of tubes 122. Third portion 128 of first number of tubes 122 is thermally connected to second side 132 of first cooling device 104. Second side 132 is configured to cool number of fluids 118 and water vapor 136 as number of fluids 118 and water vapor 136 flow through third portion 128 of first number of tubes 122.

In these illustrative examples, water 150 is extracted from number of fluids 118 and water vapor 136 through the cooling of number of fluids 118 and water vapor 136 by first cooling device 104 and second cooling device 106. In particular, water 150 may be extracted from number of fluids 118 and water vapor 136 using condensation. Condensation is the change in the physical state from a gas to a liquid. In these illustrative examples, condensation occurs in response to the cooling of number of fluids 118 and water vapor 136 by first cooling device 104 and second cooling device 106. In this manner, water 150 is in a liquid state.

As depicted, number of fluids 118 and water vapor 136 flow from third portion 128 of first number of tubes 122 towards output 152. Output 152 is at opening 154 for first number of tubes 122. Water 150 extracted from number of fluids 118 and water vapor 136 is collected at output 152. For example, water 150 is collected using container 156. Container 156 is positioned relative to output 152 for number of fluids 118 and water vapor 136 to collect water 150 that flows out of output 152. Container 156 may also be referred to as a water reservoir.

In these illustrative examples, controller 108 may be implemented using a number of hardware, software, and/or firmware components. For example, controller 108 may be an electronic circuit, a processor unit, or some other suitable type of controller.

Controller 108 is configured to control power 110 used by first cooling device 104 and second cooling device 106. In particular, controller 108 is configured to control first amount of power 158 used by first cooling device 104 and second amount of power 160 used by second cooling device 106.

In these illustrative examples, first converter 162 is configured to deliver first amount of power 158 to first cooling device 104 using power 110. In particular, first converter 162 changes a first voltage, at which electrical current 116 generated by fuel cell system 112 is received at first converter 162, to a second voltage to deliver first amount of power 158 to first cooling device 104. In a similar manner, second converter 164 is configured to deliver second amount of power 160 to second cooling device 106 using power 110. In these depicted examples, first converter 162 and second converter 164 may be direct current to direct current (DC-DC) converters. In some illustrative examples, second converter 164 may be a direct current to alternating current (DC-AC) converter.

Controller 108 controls first amount of power 158 and second amount of power 160 based on temperature 166 of number of fluids 118 and water vapor 136 at output 152. Temperature 166 is identified using temperature sensor 168 at output 152. Temperature sensor 168 is located in first number of tubes 122 at output 152. Temperature sensor 168 detects temperature 166 and sends temperature 166 to controller 108.

Controller 108 uses temperature 166 to determine whether to increase or decrease first amount of power 158 and/or second amount of power 160 such that water 150 is extracted from number of fluids 118 and water vapor 136 at a desired speed. Desired speed 170 may be a maximum speed for extracting water 150 from number of fluids 118 and water vapor 136 given environment 146 and/or conditions in which water extraction system 100 operates.

Controller 108 controls first amount of power 158 and second amount of power 160 such that temperature 166 substantially equals selected temperature 172 within a selected tolerance. Selected temperature 172 is the temperature at which water 150 is extracted at substantially desired speed 170. In these illustrative examples, selected temperature 172 may be an ambient temperature for water extraction system 100.

The ambient temperature is the temperature of the air in the environment. Controlling temperature 166 to substantially equal the ambient temperature provides a balance between water condensation and power consumption by first cooling device 104 and second cooling device 106. In some illustrative examples, selected temperature 172 may be set to a temperature close to ambient temperature. In other illustrative examples, if the ambient temperature is lower than about zero degrees Celsius, then zero degrees Celsius may be used as selected temperature 172.

In this manner, the different advantageous embodiments provide a system for extracting water 150 from both number of fluids 118 and water vapor 136, as well as controlling the speed of extracting water 150.

In these illustrative examples, the portion of first number of tubes 122 between fuel cell system 112 and second portion 126 of first number of tubes 122 in second cooling device 106, container 138, and second number of tubes 140 forms a collection system. This collection system is configured to collect both number of fluids 118 and water vapor 136. Further, the portion of first number of tubes 122 between third portion 128 of first number of tubes 122 and opening 154 forms an output system. This output system has output 152.

The illustration of water extraction system 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, source 102 may be some other type of source other than fuel cell system 112. For example, in some advantageous embodiments, source 102 may be an engine system configured to generate power 110 and number of fluids 118 in response to generating power 110. In still other illustrative examples, an additional number of sources, in addition to source 102, may be present.

Figure 2:
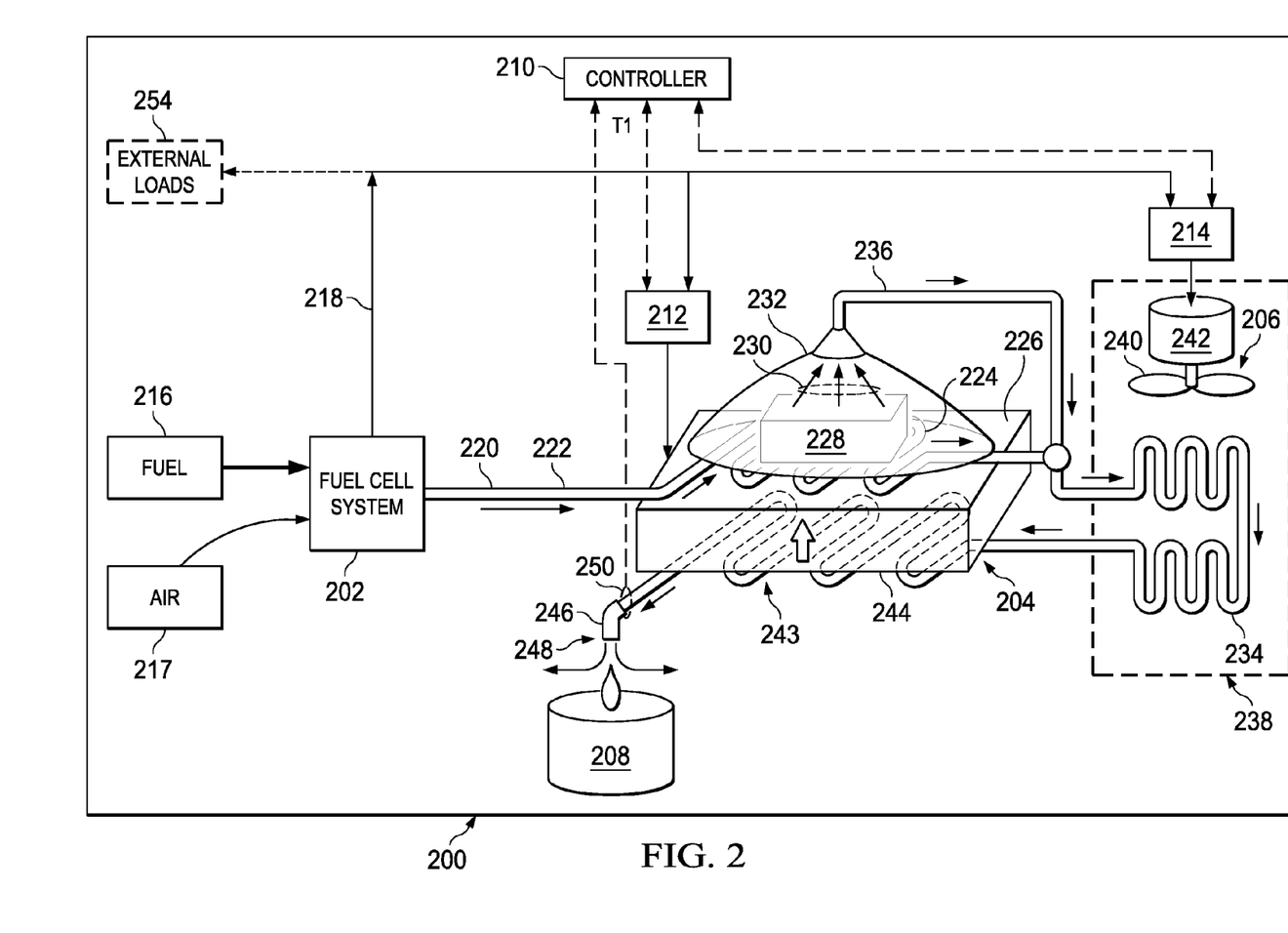
FIG. 2 is an illustration of a water extraction system in accordance with an advantageous embodiment.

With reference now to FIG. 2, an illustration of a water extraction system is depicted in accordance with an advantageous embodiment. In this illustrative example, water extraction system 200 is an example of one implementation for water extraction system 100 in FIG. 1.

As depicted, water extraction system 200 includes fuel cell system 202, thermoelectric cooler 204, radiator system 206, container 208, controller 210, first converter 212, and second converter 214. Fuel cell system 202 uses fuel 216 and air 217 to generate power 218. Fuel 216 may be, for example, hydrogen. Further, fuel cell system 202 generates exhaust 220 in response to generating power 218. Exhaust 220 comprises water, carbon dioxide, carbon monoxide, and/or other fluids. In this illustrative example, exhaust 220 is in a gaseous form.

Exhaust 220 flows through tube 222 towards thermoelectric cooler 204. As depicted, exhaust 220 flows into first portion 224 of tube 222. First portion 224 of tube 222 is thermally connected to first side 226 of thermoelectric cooler 204. First side 226 includes a hot plate for thermoelectric cooler 204.

In this illustrative example, first side 226 is configured to heat number of materials 228 located at first side 226 to generate water vapor 230. Further, exhaust 220 flowing through first portion 224 of tube 222 also heats number of materials 228 to generate water vapor 230.

Number of materials 228 contains water. For example, number of materials 228 may include soil, grass, and/or leaves containing water. Heating of number of materials 228 converts the water in number of materials 228 into water vapor 230. Water vapor 230 that is generated collects in container 232 located on first side 226 of thermoelectric cooler 204.

In this depicted example, exhaust flows from first portion 224 of tube 222 into second portion 234 of tube 222. Further, tube 236 connects container 232 to tube 222. Water vapor 230 flows from container 232 through tube 236 into tube 222 such that water vapor 230 flows into second portion 234 of tube 222.

As depicted, second portion 234 of tube 222 is in radiator system 206. Heat from exhaust 220 and water vapor flowing in tube 222 is transferred to second portion 234 of tube 222. The heat in second portion 234 of tube 222 is transferred to environment 238 around radiator system 206. Radiator system 206 also includes fan 240. Motor 242 operates fan 240. Fan 240 operates to generate airflow to move the heated air in environment 238 away from second portion 234 of tube 222.

In this illustrative example, exhaust 220 and water vapor 230, cooled by radiator system 206, flow into third portion 243 of tube 222. Third portion 243 of tube 222 is thermally connected to second side 244 of thermoelectric cooler 204. Second side 244 cools exhaust 220 and water vapor 230 as exhaust 220 and water vapor 230 flow through third portion 243 of tube 222.

Further, water is extracted from exhaust 220 and water vapor 230 as exhaust 220 and water vapor 230 are cooled by radiator system 206 and second side 244 of thermoelectric cooler 204. This water flows out of output 246 at opening 248 of tube 222 into container 208. Container 208 collects the water. While water flows into container 208, other fluids in exhaust 220 and/or flowing in tube 222 are released into the area around opening 248 of tube 222.

In this illustrative example, first converter 212 is configured to deliver power 218 to thermoelectric cooler 204. Second converter 214 is configured to deliver power 218 to radiator system 206. The amount of power delivered to thermoelectric cooler 204 and radiator system 206 by first converter 212 and second converter 214, respectively, is controlled by controller 210.

Controller 210 uses the temperature identified by temperature sensor 250 at output 246 for exhaust 220 and water vapor 230 to control the amount of power delivered to thermoelectric cooler 204 and the amount of power delivered to radiator system 206.

Additionally, in some illustrative examples, power 218 may also be delivered to external loads 254 that are external to water extraction system 200. External loads 254 may include, for example, without limitation, a motor drive; a lighting system; a heating, vacuum, and air-conditioning (HVAC) system; a power system distribution bus; and/or some other suitable type of external load.

The illustration of water extraction system 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments.

For example, in some advantageous embodiments, tube 222 may be replaced by more than one tube. In some illustrative examples, tube 236 may be replaced by one or more tube.

Further, the illustration of water extraction system 200 in FIG. 2 may not be depicted to scale, and the different components may have different sizes and/or shapes relative to each other.

Figure 3:
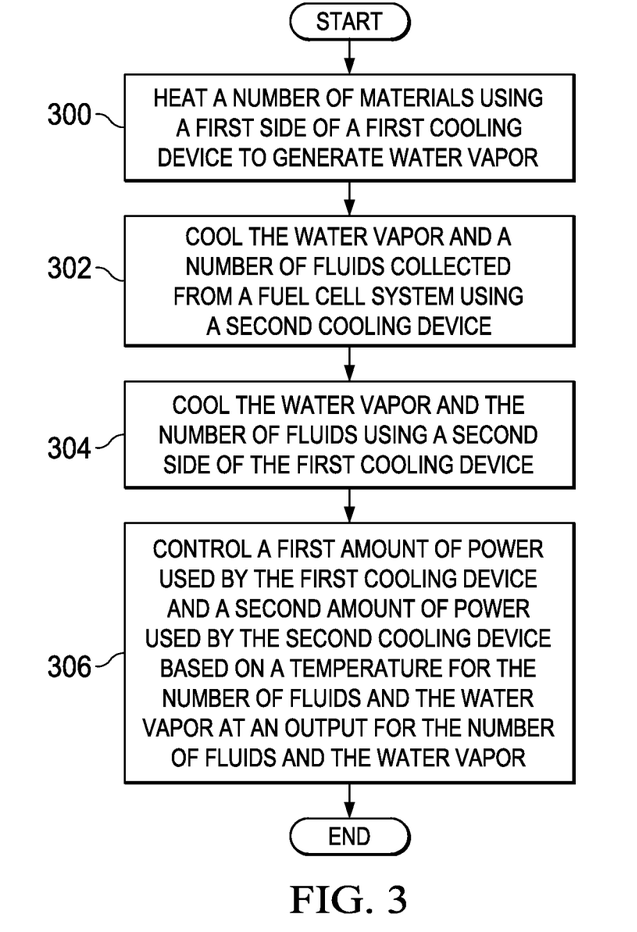
FIG. 3 is an illustration of a flowchart of a process for extracting water in accordance with an advantageous embodiment.

With reference now to FIG. 3, an illustration of a flowchart of a process for extracting water is depicted in accordance with an advantageous embodiment. The process illustrated in FIG. 3 may be implemented using water extraction system 100 in FIG. 1.

The process begins by heating a number of materials using a first side of a first cooling device to generate water vapor (operation 300). The first cooling device may be a thermoelectric cooler, for example. The number of materials is located at the first side of the first cooling device. Further, the number of materials contains water that may be extracted using the water vapor.

In operation 300, the number of materials is also heated by a number of fluids flowing relative to the first side of the first cooling device. The number of fluids may be, for example, the exhaust of a fuel cell system. Heat from the number of fluids is transferred from the number of fluids to the number of materials which heats the number of materials through the first side of the cooling device and, in turn, cools the number of fluids.

Thereafter, the process cools the water vapor and a number of fluids collected from a fuel cell system using a second cooling device (operation 302). The second cooling system may be, for example, a radiator system. The number of fluids is an exhaust for the fuel cell system. The process then cools the water vapor and the number of fluids using a second side of the first cooling device (operation 304).

Thereafter, the process controls a first amount of power used by the first cooling device and a second amount of power used by the second cooling device based on a temperature for the number of fluids and the water vapor at an output for the number of fluids and the water vapor (operation 306), with the process terminating thereafter. In this manner, the process described above allows water to be extracted at a desired speed by controlling the temperature for the number of fluids and the water vapor at the output by controlling the first amount of power used by the first cooling device and a second amount of power used by the second cooling device.

Water extracted from the number of fluids and the water vapor by cooling the number of fluids and the water vapor is collected at the output.

Figure 4:
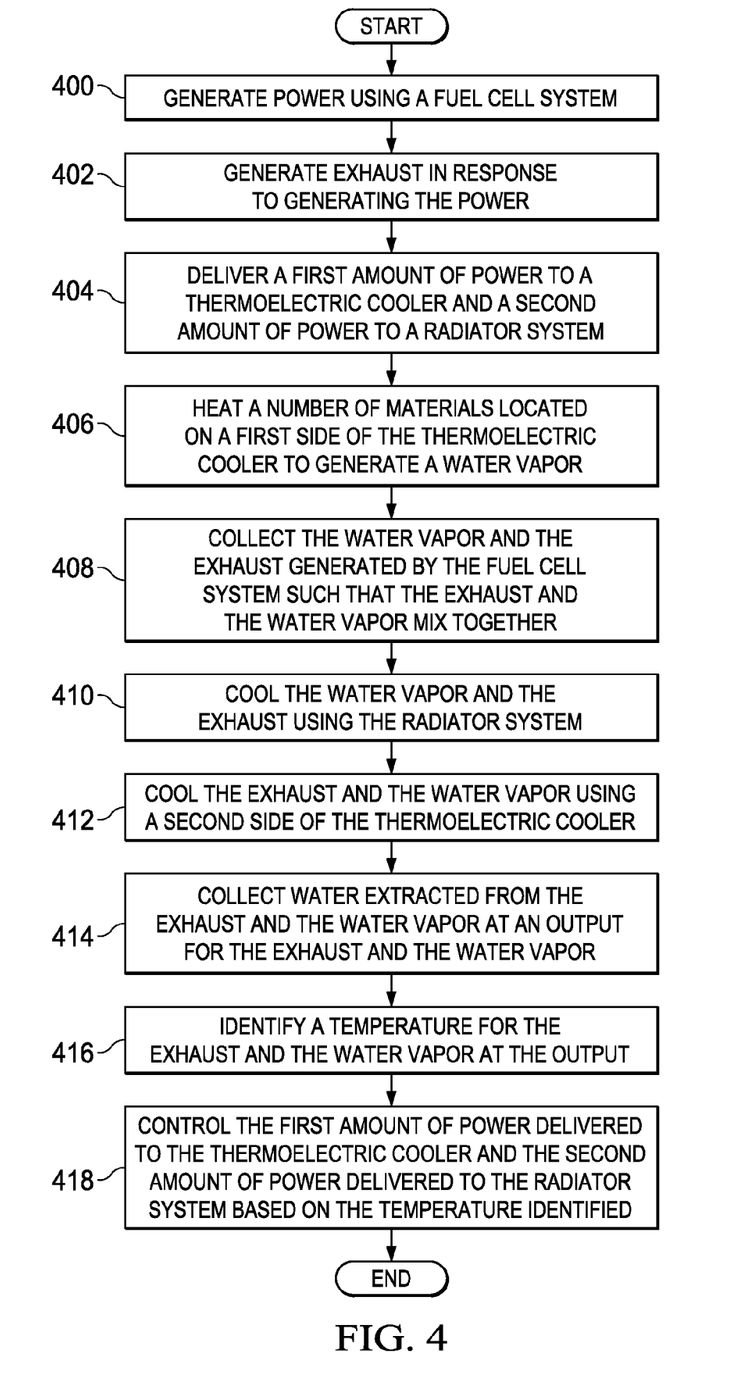
FIG. 4 is an illustration of a flowchart of a process for extracting water in accordance with an advantageous embodiment.

With reference to FIG. 4, an illustration of a flowchart of a process for extracting water is depicted in accordance with an advantageous embodiment. The process illustrated in FIG. 4 is a more-detailed process for the process illustrated in FIG. 3. This process may be implemented using water extraction system 100 in FIG. 1 and/or water extraction system 200 in FIG. 2.

The process begins by generating power using a fuel cell system (operation 400). The fuel cell system may convert a fuel, such as hydrogen or a hydrocarbon, and an oxidizer, such as air, into an electrical current to generate the power. The process generates exhaust in response to generating the power (operation 402). In other words, the exhaust comprises the by-products of converting the fuel and the oxidizer into an electrical current, or electricity. Operation 402 may be performed while operation 400 is being performed in these illustrative examples.

The process delivers a first amount of power to a thermoelectric cooler and a second amount of power to a radiator system (operation 404). The first amount of power may be delivered using a first converter, and the second amount of power may be delivered using a second converter.

The process then heats a number of materials located on a first side of the thermoelectric cooler to generate a water vapor (operation 406). In operation 406, the number of materials contains water, which can be extracted. Operation 406 may be performed by heating the number of materials using the first side of the thermoelectric cooler.

Further, operation 406 may also be performed using heat generated as the exhaust generated by the fuel cell system flows in number of tubes thermally connected to the first side of the thermoelectric cooler. In particular, heat is transferred from the exhaust to the number of materials to heat the number of materials. The transfer of heat from the exhaust cools the exhaust.

The process collects the water vapor and the exhaust generated by the fuel cell system such that the exhaust and the water vapor mix together (operation 408). Thereafter, the process cools the water vapor and the exhaust using the radiator system (operation 410). Operation 410 is performed by transferring heat from the exhaust and the water vapor to an environment around the radiator system. In particular, the heat is transferred to the air in the environment around the radiator system.

Next, the process cools the exhaust and the water vapor using a second side of the thermoelectric cooler (operation 412). The process collects water extracted from the exhaust and the water vapor at an output for the exhaust and the water vapor (operation 414). The water that is extracted flows out of the output and into a container for collecting the water in operation 414. The process then identifies a temperature for the exhaust and the water vapor at the output (operation 416). The temperature may be identified using a temperature sensor located at the output.

Thereafter, the process controls the first amount of power delivered to the thermoelectric cooler and the second amount of power delivered to the radiator system based on the temperature identified (operation 418), with the process terminating thereafter. In this manner, a desired or maximum speed of water extraction may be achieved.

Operation 416 and operation 418 may be repeated and/or performed continuously until the water extraction system is shut down. In other words, operation 416 and operation 418 may be repeated and/or performed continuously as operations 400-414 are being performed continuously.

Figure 5A:
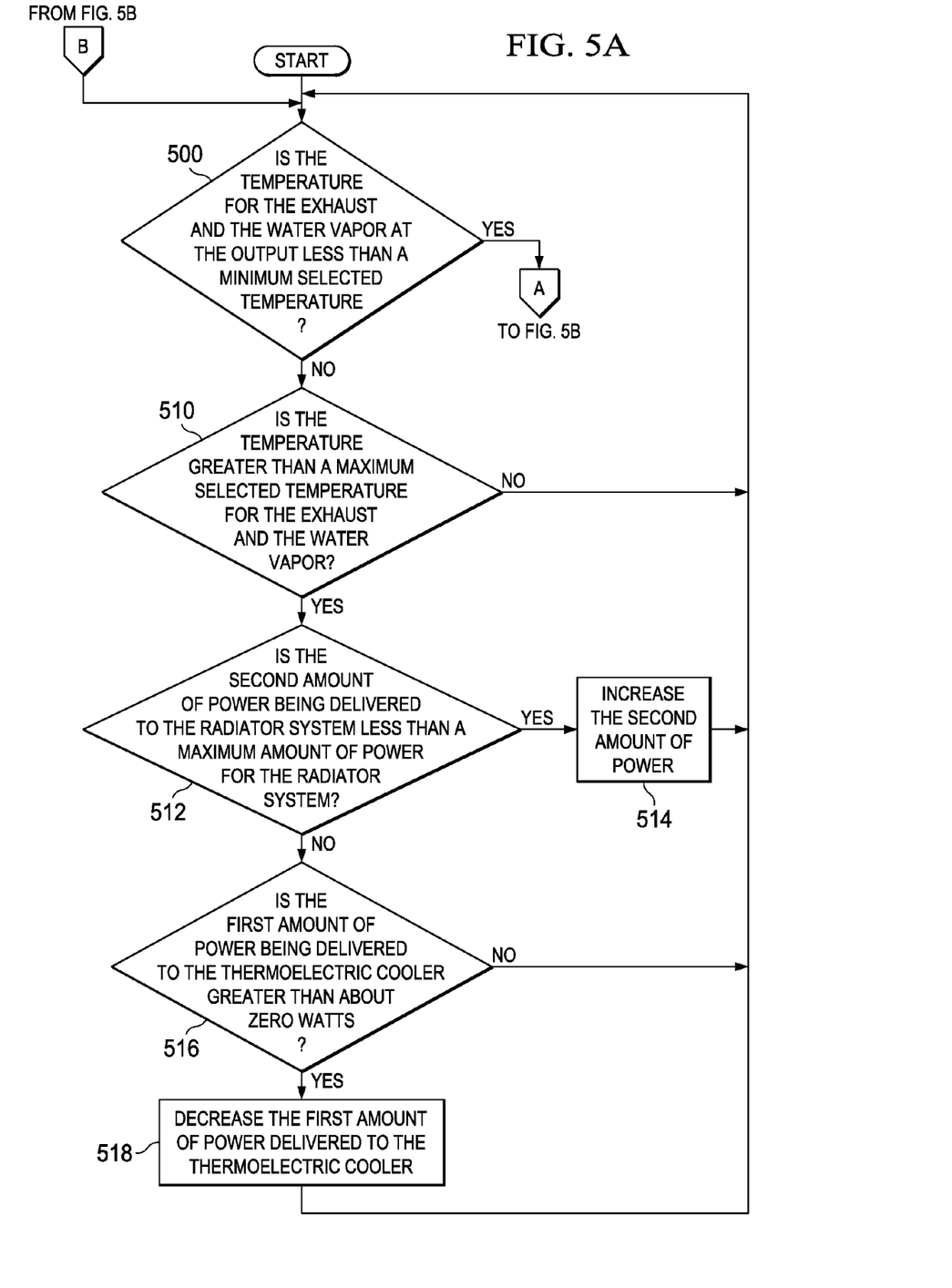
FIGS. 5A and 5B are illustrations of a flowchart of a process for controlling a delivery of power in accordance with an advantageous embodiment.
Figure 5B:
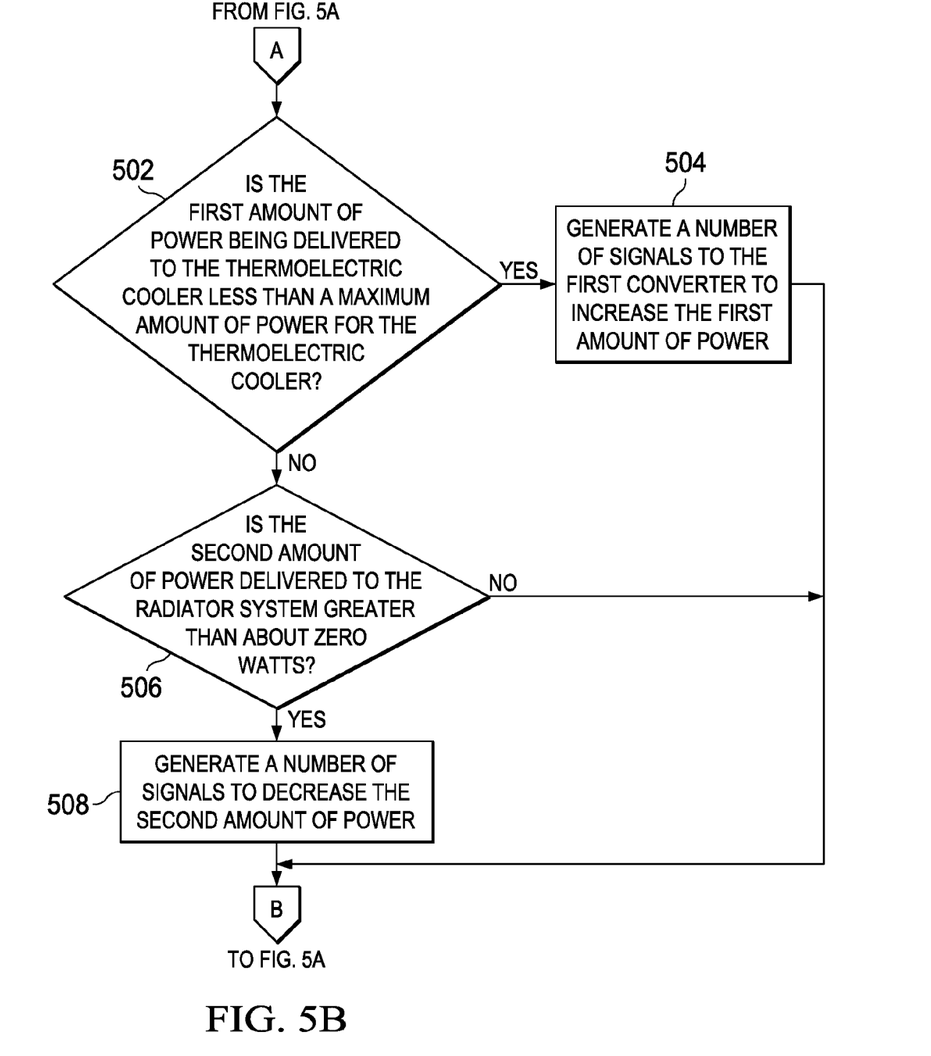

With reference now to FIGS. 5A and 5B, illustrations of a flowchart of a process for controlling a delivery of power are depicted in accordance with an advantageous embodiment. The process illustrated in FIGS. 5A and 5B may be used to perform operation 418 in FIG. 4. Further, this process may be used to control the temperature of the number of fluids and the water vapor at the output for the number of fluids and the water vapor such that the temperature is within a selected range.

The process begins by determining whether the temperature for the exhaust and the water vapor at the output is less than a minimum selected temperature (operation 500). In this illustrative example, the temperature for the exhaust and the water vapor may be desired to be within a selected tolerance of a selected temperature. The selected tolerance for the selected temperature identifies a minimum selected temperature and a maximum selected temperature within which the temperature for the exhaust and the water vapor is desired to lie.

For example, the selected temperature may be ambient temperature in degrees Celsius. The selected tolerance may be about three degrees Celsius with respect to the selected temperature. In other words, the minimum selected temperature is about three degrees Celsius below the ambient temperature, and the maximum selected temperature is about three degrees Celsius above the ambient temperature.

With reference again to operation 500, if the temperature is less than the minimum selected temperature, the process determines whether the first amount of power being delivered to the thermoelectric cooler is less than a maximum amount of power for the thermoelectric cooler (operation 502). The maximum amount of power for the thermoelectric cooler is an operation limit beyond which undesired effects may occur with the thermoelectric cooler.

With reference again to operation 502, if the first amount of power is less than the maximum amount of power for the thermoelectric cooler, the process generates a number of signals to the first converter to increase the first amount of power (operation 504), with the process then returning to operation 500 as described above.

Otherwise, if the first amount of power is not less than the maximum amount of power for the thermoelectric cooler, the process determines whether the second amount of power delivered to the radiator system is greater than about zero watts (operation 506).

If the second amount of power delivered to the radiator system is not greater than about zero watts, the process returns to operation 500 as described above. Otherwise, the process generates a number of signals to decrease the second amount of power (operation 508), with the process then returning to operation 500 as described above.

With reference again to operation 500, if the temperature is not less than the minimum selected temperature, the process determines whether the temperature is greater than a maximum selected temperature for the exhaust and the water vapor (operation 510). If the temperature is not greater than the maximum selected temperature for the exhaust and the water vapor, the process returns to operation 500.

Otherwise, the process determines whether the second amount of power being delivered to the radiator system is less than a maximum amount of power for the radiator system (operation 512). The maximum amount of power for the radiator system is an operation limit beyond which undesired effects and/or decreased performance may occur with a motor operating a fan for the radiator system. If the second amount of power being delivered to the radiator system is less than the maximum amount of power for the radiator system, the process increases the second amount of power (operation 514), with the process then returning to operation 500 as described above.

Otherwise, in this illustrative example, the process determines whether the first amount of power being delivered to the thermoelectric cooler is greater than about zero watts (operation 516). If the first amount of power being delivered to the thermoelectric cooler is not greater than about zero watts, the process returns to operation 500.

Otherwise, the process decreases the first amount of power delivered to the thermoelectric cooler (operation 518), with the process then returning to operation 500 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for extracting water. In one advantageous embodiment, the method comprises a first cooling device, a second cooling device, and a controller. The first cooling device has a first side and a second side. The first side is configured to heat a number of materials located at the first side of the first cooling device to generate a water vapor. The second side is configured to cool the water vapor and a number of fluids collected from a source.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A water extraction system comprising:
a fuel cell system configured to generate power, wherein the fuel cell system generates a number of fluids in response to generating the power;
a cooling device having a first side and a second side, wherein the cooling device is connected to the fuel cell system and operates using the power generated by the fuel cell system, the cooling device comprising a thermoelectric cooler wherein the power is configured to warm the first side of the cooling device and the power is configured to cool the second side of the device, and wherein the first side is configured to heat a number of materials located at the first side of the cooling device in which water in the number of materials is converted into a water vapor;
a first number of tubes connected to the first side of the cooling device and thermally connected to the second side of the first cooling device, and wherein the number of fluids from the fuel cell system flows through the first number of tubes, the first number of tubes also configured to heat the number of materials;
a collection system configured to collect the water vapor generated by heating the number of materials, the collection system comprising an opening connected to a second number of tubes, the opening configured to receive the water vapor and the second number of tubes configured to flow the water vapor so as to join the first number of tubes;
a radiator system connected to the fuel cell system and the collection system and configured to transfer heat from the water vapor and the number of fluids in the first number of tubes to an environment around the radiator system, the first number of tubes passing through the radiator system, the second number of tubes configured to flow the water vapor into the first number tubes upstream from the first number of tubes entering the radiator system;
an output system connected to the radiator system, the output system including at least a portion of the first number of tubes, wherein the output system is configured to direct the water vapor and the number of fluids from the radiator system to the second side of the cooling device, wherein the second side cools the water vapor and the number of fluids; and
a controller configured to control a first amount of power delivered to the cooling device and a second amount of power delivered to the radiator system based on a temperature for the number of fluids and the water vapor at an output of the output system.

2. The water extraction system of claim 1, wherein the controller is further configured to generate a number of signals to increase the first amount of power delivered to the cooling device when the temperature for the number of fluids and the water vapor at the output is less than a minimum selected temperature and when the first amount of power delivered to the cooling device is less than a maximum amount of power for the cooling device; and decrease the first amount of power delivered to the cooling device when the temperature is greater than a maximum selected temperature, the first amount of power delivered to the cooling device is greater than about zero watts, and the second amount of power to the radiator system is not less than a maximum amount of power for the radiator system.

3. The water extraction system of claim 1, wherein the controller is further configured to generate a number of signals to increase the second amount of power delivered to the radiator system when the temperature for the number of fluids and the water vapor at the output is greater than a maximum selected temperature and the second amount of power delivered to the radiator system is less than a maximum amount of power for the radiator system; and decrease the second amount of power delivered to the radiator system when the temperature is less than a minimum selected temperature, the first amount of power delivered to the cooling device is not less than a maximum amount of power for the cooling device, and the second amount of power delivered to the radiation system is greater than about zero watts.

4. The water extraction system of claim 1, wherein the thermoelectric cooler comprises a Peltier device.

5. The water extraction system of claim 1, wherein the first number of tubes comprises a first portion thermally connected to the first side of the cooling device, a second portion, and a third portion thermally connected to the second side of the first cooling device.

6. The water extraction system of claim 5, wherein the number of fluids from the fuel cell system flows through the first portion, the second portion, and the third portion of the first number of tubes.

7. The water extraction system of claim 5, wherein the first portion of the first number of tubes is configured to heat the number of materials.

8. The water extraction system of claim 5, wherein the second number of tubes is configured to flow the water vapor so as to join the first portion of the first number of tubes.

9. The water extraction system of claim 5, wherein the radiator system is configured to transfer the heat from the water vapor and the number of fluids in the second portion of the first number of tubes to the environment.

10. The water extraction system of claim 5, wherein the second portion of the first number of tubes passes through the radiator system.

11. The water extraction system of claim 5, wherein the second number of tubes joins the first portion of the first number of tubes prior to the first number of tubes entering the radiator system.

12. The water extraction system of claim 5, wherein the output system comprises the third portion of the first number of tubes.

13. An apparatus comprising:
a fuel cell system configured to generate power;
a first cooling device having a first side and a second side, wherein the first side is configured to heat a number of materials located at the first side of the first cooling device to generate a water vapor and the second side is configured to cool the water vapor and a number of fluids collected from a source, the cooling device comprising a thermoelectric cooler wherein the power from the fuel cell system warms the first side of the cooling device and the power cools the second side of the device;

a second cooling device configured to transfer heat from the water vapor and the number of fluids flowing through the second cooling device to an environment around the second cooling device;

a container located on the first side of the first cooling device and configured to hold the number of materials;

a first number of tubes connected to the first side of the first cooling device and thermally connected to the second side of the first cooling device, and wherein the number of fluids from the fuel cell system flows through the first number of tubes, the first number of tubes also configured to heat the number of materials;

an opening and a second number of tubes, the opening configured to receive the water vapor from the number of materials, the second number of tubes configured to flow the water vapor into the first number tubes upstream from the first number of tubes entering the second cooling device; and a controller configured to control a first amount of power delivered to the first cooling device and a second amount of power delivered to the second cooling device based on a temperature for the number of fluids and the water vapor at an output for the number of fluids and the water vapor, wherein water extracted from the number of fluids and the water vapor by cooling the number of fluids and the water vapor is collected at the output.

14. The apparatus of claim 13, wherein the fuel cell system is configured to generate power and generate the number of fluids in response to generating the power, wherein the number of fluids is an exhaust of the fuel cell system and wherein the first cooling device and the second cooling device operate using the power generated by the fuel cell system.

15. The apparatus of claim 14, wherein the controller is further configured to generate a number of signals to increase the second amount of power delivered to a radiator system when the temperature for the number of fluids and the water vapor at the output is greater than a maximum selected temperature and the second amount of power delivered to the radiator system is less than a maximum amount of power for the radiator system; and decrease the second amount of power delivered to the radiator system when the temperature is less than a minimum selected temperature, the first amount of power delivered to the first cooling device is not less than a maximum amount of power for the first cooling device, and the second amount of power delivered to the radiator system is greater than about zero watts.

16. The apparatus of claim 13, wherein the controller is further configured to generate a number of signals to increase the first amount of power delivered to the first cooling device when the temperature for the number of fluids and the water vapor at the output is less than a minimum selected temperature and when the first amount of power delivered to the first cooling device is less than a maximum amount of power for the first cooling device; and decrease the first amount of power delivered to the first cooling device when the temperature is greater than a maximum selected temperature, the first amount of power delivered to the first cooling device is greater than about zero watts, and the second amount of power to a radiator system is not less than a maximum amount of power for the radiator system.

17. The apparatus of claim 13 further comprising:
a first converter, wherein the first converter is configured to deliver the first amount of power to the first cooling device; and
a second converter, wherein the second converter is configured to deliver the second amount of power to the first cooling device.

18. The apparatus of claim 13, wherein the number of fluids flowing through the first portion of the first number of tubes thermally connected to the first side of the first cooling device heats the number of materials at the first side of the first cooling device to generate the water vapor.

19. The apparatus of claim 13, wherein the number of fluids flowing through the first portion of the first number of tubes thermally connected to the first side of the first cooling device cools the number of fluids.

20. The apparatus of claim 13, wherein the second cooling device comprises:
a number of tubes configured to transfer the heat from the water vapor and the number of fluids flowing through the number of tubes to the environment around the second cooling device; and
a fan configured to generate airflow in the environment around the second cooling device to move heated air in the environment away from the number of tubes.

21. The apparatus of claim 13 further comprising:
a temperature sensor located at the output for the number of fluids and the water vapor, wherein the temperature sensor is configured to identify the temperature for the number of fluids and the water vapor at the output.

22. The apparatus of claim 13, wherein the first cooling device is a thermoelectric cooler and the second cooling device is a radiator system.

23. A method for extracting water, the method comprising:
generating power using a fuel cell system;
flowing a number of fluids generated by a fuel cell through a first number of tubes;
warming a first side of a first cooling device comprising a thermoelectric cooler with the power from the fuel cell system;
cooling a second side of the first cooling device with the power from the fuel cell system;
heating a number of materials using the first side of the first cooling device and the first number of tubes to generate a water vapor, wherein the number of materials is located at the first side of the first cooling device;
collecting the water vapor in a second number of tubes;
directing the water vapor in the second number of tubes to the first number of tubes;
cooling the water vapor and a number of fluids collected from a fuel cell system using a second cooling device, the first number of tubes positioned in the second cooling device, and the water vapor in the second number of tubes joining the first number of tubes upstream from the first number of tubes entering the second cooling device;
cooling the water vapor and the number of fluids using the second side of the first cooling device, the first number of tubes positioned adjacent the second side of the first cooling device; and
controlling a first amount of power delivered to the first cooling device and a second amount of power delivered to the second cooling device based on a temperature for the number of fluids and the water vapor at an output for the number of fluids and the water vapor, wherein the water extracted from the number of fluids and the water vapor by cooling the number of fluids and the water vapor is collected at the output.

24. The method of claim 23 further comprising:
operating the first cooling device and the second cooling device using the power generated by the fuel cell system.

25. The method of claim 23, wherein the step of heating the number of materials using the first side of the first cooling device to generate the water vapor, wherein the number of materials is located at the first side of the first cooling device comprises:
  heating the number of materials using the first side of the first cooling device to generate the water vapor; and
  heating the number of materials using heat generated as the number of fluids flows in a number of tubes thermally connected to the first side of the first cooling device.

26. The method of claim 23, wherein the second cooling device is a radiator system and wherein the step of cooling the water vapor and the number of fluids collected from the fuel cell system using the second cooling device comprises:
  transferring heat from the number of fluids and the water vapor to an environment around the radiator system as the number of fluids and the water vapor flows through a number of tubes in the radiator system.

27. The method of claim 23 further comprising:
  detecting the temperature for the number of fluids and the water vapor at the output using a temperature sensor located at the output.

28. The method of claim 23, wherein the step of controlling the first amount of power delivered to the first cooling device and the second amount of power delivered to the second cooling device based on the temperature for the number of fluids and the water vapor at the output for the number of fluids and the water vapor, wherein the water extracted from the number of fluids and the water vapor by cooling the number of fluids and the water vapor is collected at the output comprises:
  comparing the temperature for the number of fluids and the water vapor at the output to a selected temperature within a selected tolerance to form a comparison; and
  using the comparison to determine whether to perform one of increasing the first amount of power, decreasing the first amount of power, increasing the second amount of power, and decreasing the second amount of power.

29. The method of claim 23, wherein the step of controlling the first amount of power delivered to the first cooling device and the second amount of power delivered to the second cooling device based on the temperature for the number of fluids and the water vapor at the output for the number of fluids and the water vapor, wherein the water extracted from the number of fluids and the water vapor by cooling the number of fluids and the water vapor is collected at the output comprises:
  generating a first number of signals to increase the first amount of power delivered to the first cooling device when the temperature for the number of fluids and the water vapor at the output is less than a minimum selected temperature and when the first amount of power delivered to the first cooling device is less than a maximum amount of power for the first cooling device;
  generating a second number of signals to decrease the first amount of power delivered to the first cooling device when the temperature is greater than a maximum selected temperature, the first amount of power delivered to the first cooling device is greater than about zero watts, and the second amount of power to the second cooling device is not less than a maximum amount of power for the second cooling device;
  generating a third number of signals to increase the second amount of power delivered to the second cooling device when the temperature for the number of fluids and the water vapor at the output is greater than the maximum selected temperature and the second amount of power delivered to the second cooling device is less than the maximum amount of power for the second cooling device; and
  generating a fourth number of signals to decrease the second amount of power delivered to the second cooling device when the temperature is less than the minimum selected temperature, the first amount of power delivered to the first cooling device is not less than the maximum amount of power for the first cooling device, and the second amount of power delivered to the second cooling device is greater than about zero watts.

30. A water extraction system comprising:
  a fuel cell system configured to generate power, wherein the fuel cell system generates a number of fluids in response to generating the power;
  a cooling device having a first side and a second side, wherein the cooling device is connected to the fuel cell system and operates using the power generated by the fuel cell system, the cooling device comprising a thermoelectric cooler wherein the power is configured to warm the first side of the cooling device and the power is configured to cool the second side of the device, and wherein the first side is configured to heat a number of materials located at the first side of the cooling device in which water in the number of materials is converted into a water vapor;
  a first number of tubes comprising a first portion thermally connected to the first side of the cooling device, a second portion, and a third portion thermally connected to the second side of the first cooling device, and wherein the number of fluids from the fuel cell system flows through the first portion, the second portion, and the third portion of the first number of tubes, the first portion of the first number of tubes also configured to heat the number of materials;
  a collection system configured to collect the water vapor generated by heating the number of materials, the collection system comprising an opening connected to a second number of tubes, the opening configured to receive the water vapor and the second number of tubes configured to flow the water vapor so as to join the first portion of the first number of tubes;
  a radiator system connected to the fuel cell system and the collection system and configured to transfer heat from the water vapor and the number of fluids in the second portion of the first number of tubes to an environment around the radiator system, the second portion of the first number of tubes passing through the radiator system, the second number of tubes configured to flow the water vapor into the first number tubes upstream from the first number of tubes entering the radiator system;
  an output system connected to the radiator system, the output system including the third portion of the first number of tubes, wherein the output system is configured to direct the water vapor and the number of fluids from the radiator system to the second side of the cooling device, wherein the second side cools the water vapor and the number of fluids; and
  a controller configured to control a first amount of power delivered to the cooling device and a second amount of power delivered to the radiator system based on a temperature for the number of fluids and the water vapor at an output of the output system.

* * * * *